Feb. 12, 1935.   V. V. BECKEL   1,990,516
VALVE MECHANISM
Filed May 3, 1933
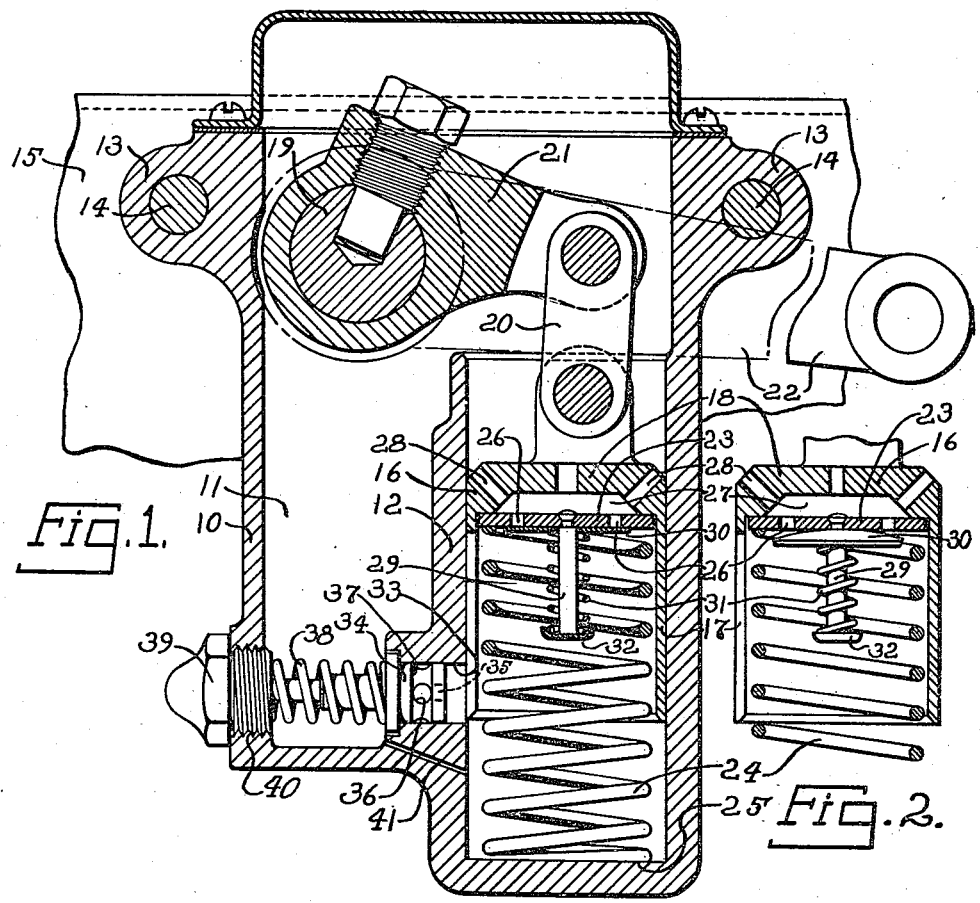
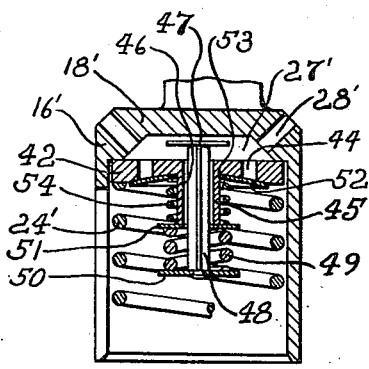
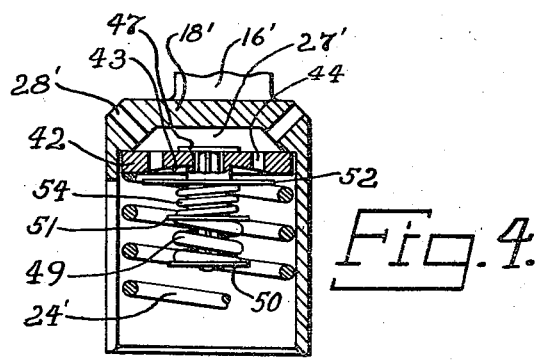
INVENTOR.
VICTOR V. BECKEL.
BY
ATTORNEYS.

Patented Feb. 12, 1935

1,990,516

UNITED STATES PATENT OFFICE 1,990,516

VALVE MECHANISM

Victor V. Beckel, Detroit, Mich., assignor to Chrysler Corporation, Detroit, Mich., a corporation of Delaware Application May 3, 1933, Serial No. 669,121

13 Claims. (Cl. 277—71)

This invention relates to improved valve mechanism and particularly to noiselessly operating mechanism of this character for fluid pressure systems, such as those embodied in hydraulic shock absorbers.

One of the main objects of the invention is to eliminate the metallic sounds during valve closing operations and the noises resulting from the breaking of a vacuum which occurs when substantially all portions of contacting surfaces of a valve and valve seat are simultaneously separated during valve opening operations.

Other objects of the invention are to provide a valve member which is constructed, and arranged with respect to its seat, in such a manner that successively adjacent portions of a valve member become progressively engaged with the valve seat during valve closing operations; to provide a flexible valve element which is adapted to be firmly held in sealed engagement with a valve seat by the application of fluid pressure on one of its sides; to provide a flexible valve element of this character which has portions disposed at diverse distances from its valve seat and which is adapted to deflect into engagement with the valve seat when fluid pressure is applied on one of its sides; to provide a valve element of this kind which has sufficient inherent resiliency to deflect away from the valve seat when such pressure is released; and to provide resilient means for yieldably holding a portion of the valve element in contact with the valve seat and which is adapted to yieldably oppose bodily movement of the valve element away from the latter.

Further objects of the invention are to provide in the piston of a hydraulic shock absorber a valve unit having a one-way acting valve which includes a seat and a cooperating resilient valve element that is constructed and arranged in such a manner that its successively adjacent portions become progressively engaged with the valve seat during the commencement of the compression strokes of the piston and become progressively disengaged from the valve seat immediately after each compression stroke thereof; and to provide a normally closed relief valve in a valve unit of this character for relieving the pressure on the compression side of the piston when such pressure exceeds a predetermined value.

An illustrative embodiment of the invention is shown in the accompanying drawing, in which:

Fig. 1 is a vertical sectional view of a hydraulic shock absorber that is equipped with a valve unit which embodies my invention.

Fig. 2 is a fragmentary sectional view of a piston and valve unit of the shock absorber illustrated in Fig. 1, showing the valve element in open position.

Fig. 3 is a fragmentary sectional view similar to Fig. 2 but illustrating a modified form of the invention and showing an inlet valve element in a closed position and a relief valve in open position.

Fig. 4 is a fragmentary sectional view illustrating the positions the parts of the form of my invention shown in Fig. 3 assume when the inlet valve is open and the relief valve is closed.

In the form shown in Figs. 1 and 2, my invention is illustrated in conjunction with the fluid pressure system of a hydraulic shock absorber which includes a casing 10 having a fluid reservoir 11 and cylinder 12 therein. The casing 10 is provided with ears 13 which are preferably secured by bolts 14 to the sprung portion 15 of a vehicle chassis. Slidably mounted in the cylinder 12 is a reciprocating piston 16 having skirt and head portions 17 and 18 respectively. The head portion 18 of the piston is connected with a journaled shaft 19 by a link 20 and crank arm 21, or other suitable means. The shaft 19 is pivotally or otherwise suitably connected with the unsprung portion of the vehicle by an arm 22, non-rotatably fixed to the shaft, and suitable links or levers (not shown). This apparatus causes the piston to reciprocate in the cylinder during relative movements of the sprung and unsprung portion of the vehicle in opposite directions.

Mounted within the skirt portion 17 of the piston and adjacent the head portion 18 thereof is a disc shaped valve seat 23 which, in the illustration shown, is firmly urged against the head portion 18 of the piston by a coil spring 24 bearing between the closed end 25 of the cylinder 12 and the valve seat. The valve seat 23 is provided with a plurality of circumferentially spaced passages 26 which leads to a chamber 27 on its outer side that is in turn communicatively connected with the fluid reservoir 11 by passages 28 formed in the head 18 of the piston. A stem 29 is fixed to the valve seat 23 at a location substantially at the center of the circumferentially arranged passages 26 thereof. Slidably mounted on the stem 29 is a flexible valve element 30 which, when in relaxed condition, is of dish-shaped contour, the central portion of the convex side of the valve element being disposed adjacent the valve seat. The valve element 30 preferably comprises resilient metal, such as spring steel, but may be formed of any material having a sufficient capacity to return to a predetermined contour after having been deflected.

The central portions of the valve element 30 are yieldably urged against the valve seat 23 by a coil spring 31 mounted on the stem 29 which bears between the valve element and a head 32 provided on the free end of the stem. The spring 31 yieldably holds the valve element 30 against bodily movement away from the valve seat.

The cylinder 12 is provided with an outlet 33 in which a relief valve 34 is mounted. The relief valve 34 has a central axially extending passage 35 which communicates with radially extending passages 36 leading to a groove 37 formed in the periphery of the valve member 34. The valve member 34 is normally held in a closed position by a coil spring 38 which bears against an adjustable nut 39 threaded in an aperture 40 of the casing 10. The spring 38 prevents the valve 34 from opening until a predetermined pressure in the cylinder 12 is exceeded. When the pressure in the cylinder 12 exceeds such a predetermined pressure the valve 34 is shifted to the left, as viewed in Fig. 1, sufficiently to bring a portion of the groove 37 into communication with the reservoir 11, thereby permitting a flow of fluid from the cylinder to the reservoir. Normally, the rate of inward movement of the piston 16 is controlled by the passage of fluid from the cylinder into the reservoir through a bleed 41.

In operation of this form of the invention, the resilient valve element 30 is normally relaxed and has the contour shown in Fig. 2 when the piston 16 is at rest. During the commencement of inward movement of the piston 16 the resilient valve element 30 is deflected by fluid pressure into parallel relationship with the inner side of the valve seat 23 so as to close the passages 26, as illustrated in Fig. 1. Further inward movement of the piston causes fluid to be discharged from the cylinder either through the bleed 41 or through the relief valve passage 34, depending upon the rate at which the piston is projected inwardly toward the closed end 25 of the cylinder. When the piston 16 ceases to move inwardly the pressure in the cylinder 12 decreases and the valve element 30 returns to its normal relaxed condition by reason of its inherent resiliency, thereby uncovering the passages 26 in the valve seat so as to permit of the flow of fluid from the reservoir to the compression side of the piston as the latter moves outwardly with respect to the cylinder during its return stroke. The spring 31 permits the valve element 30 to move bodily away from the valve seat 23 during rapid outward movement so as to avoid obstruction of the flow of fluid through the passages 26.

The curvilinear contour of the side of the resilient valve element 30 which is adjacent the valve seat and the diverse distances between the latter and portions of the valve element cause successively adjacent portions of the convex side of the valve element to become progressively engaged with and disengaged from the valve seat during valve closing and opening operations respectively. This action eliminates the objectionable metallic sound which occurs when substantially all portions of a conventional valve element simultaneously contact with its seat during valve closing operations, as well as the objectionable noise created by the breaking of vacuum which occurs when substantially all portions of a valve element are simultaneously removed from a valve seat during valve opening operations.

The valve unit embodied in the form of my invention shown in Figs. 3 and 4 is adapted for installation in a piston 16' of a hydraulic shock absorber of the same general character as that shown in Fig. 1 with the exception that the relief valve is incorporated in the valve unit of the piston and therefore the provision of an individual relief valve like the valve 34 in Fig. 1 is unnecessary. Mounted adjacent the head 18' of the piston 16' is a disc-shaped valve seat 42 which is provided on its inner side with a dished recess 43 and with passages 44 which communicate with the recess. Integrally formed on the central portion of the valve seat 42 is a tubular stem 45 having a passage 46 leading from the interior of the piston and the cylinder in which it is received to a chamber 27'. The head portion 16' of the piston is provided with passages 28' which communicate with the chamber 27' and with the fluid reservoir of a shock absorber.

A relief valve 47 having a splined stem 48 slidably mounted in the passage 46 normally seals the outer end of the latter passage and prevents outward flow of fluid from the interior of the cylinder in which the piston operates. This valve is yieldably held in a closed position by a coil spring 49 which bears between a washer 50 on the inner end of the valve stem 48 and a washer 51 seated upon the inner extremity of the tubular valve stem 45.

A resilient disc-shaped valve element 52 having a central aperture 53 is slidably mounted on the stem 45 and yieldably urged towards the valve seat 42 by a coil spring 54 which bears between the washer 51 and one side of the resilient valve element. The resilient valve element, when relaxed, is normally flat and the spring 54 acting thereon is preferably under only sufficient compression to urge the outer edge portions of the resilient valve element into contact with the valve seat 52, this spring being too weak to deflect the resilient valve element and cause it to conform to the concaved curvature of the end wall of the recess 43.

During operation of this form of the invention, the resilient valve element 52 is normally planular in shape and lightly held in contact with the valve seat while the piston is at rest. The fluid pressure to which the flexible valve element is subjected at the commencement of each compression stroke of the piston causes the valve to be deflected into sealed engagement with the curvilinear surface of the dished recess 43, thereby preventing the outward flow of fluid through the passages 44. When the pressure in the cylinder in which the piston operates decreases at the end of each compression stroke, the valve element 52 is restored by reason of its inherent resiliency to its normal planular shape, and during each return stroke of the piston, fluid flowing inwardly through the passages 44 moves the valve element 52 bodily away from the valve seat 42 to the position shown in Fig. 4.

When the pressure in the cylinder in which the piston 16' operates exceeds a predetermined value the fluid of the cylinder, some of which flows between the splines of the valve stem 48, acts upon the relief valve 47 and opens the latter to the position illustrated in Fig. 3, against the compression of the spring 49.

The normal relationship of the end wall of the dished recess 43 and resilient valve element 52 is such that portions of the valve element are spaced at diverse distances from the end wall of the recess and therefore as fluid pressure is applied upon the resilient valve, successively adjacent portions thereof become progressively engaged with the end wall of the dished recess and when this fluid pressure is released, successively adjacent portions of the valve element become progressively disengaged from the end wall of the recess. Complete disengagement of the valve element and its seat does not occur until after the return stroke of the piston commences and while the piston is at rest only a small area of the resilient valve element is in contact with its seat. Therefore, during the final opening of the valve element there is substantially no inrush of fluid into the space between the valve element and its seat and accordingly the excessive noise which occurs during opening of conventional valves is obviated.

Although but several specific embodiments of my invention are herein shown and described, it will be understood that various changes in the size, shape and arrangement of parts may be made without departing from the spirit of my invention, and it is not my intention to limit its scope other than by the terms of the appended claims.

What I claim is:

1. In a fluid pressure system, a fluid flow control unit including a valve seat having a passage therethrough, a resilient valve element adapted to be held in engagement with said valve seat by the application of fluid pressure, said valve element when in a closed position being deflected from its normal relaxed contour by such fluid pressure and constructed and arranged in such a manner that successively adjacent portions thereof progressively become disengaged from said valve seat when the application of fluid pressure thereon is discontinued, and means yieldably holding said valve element against bodily movement away from said valve seat.

2. In a fluid pressure system, a fluid flow control unit including a valve seat having a protruding stem and a plurality of passages surrounding said stem, a resilient valve element slidably mounted on said stem adapted to be deflected by the application of fluid pressure on one side thereof from its normal relaxed contour into engagement with said valve seat for closing said passages, said valve element being constructed and arranged in such a manner that successively adjacent portions thereof progressively become disengaged from said valve seat when the application of fluid pressure thereon is discontinued.

3. In a fluid pressure system, a fluid flow control unit including a valve seat having a protruding stem and a plurality of passages surrounding said stem, a resilient valve element slidably mounted on said stem adapted to be deflected by the application of fluid pressure on one side thereof from its normal relaxed contour into engagement with said valve seat for closing said passages, said valve element being constructed and arranged in such a manner that successively adjacent portions thereof progressively become disengaged from said valve seat when the application of fluid pressure thereon is discontinued, and resilient means bearing between said stem and valve element for yieldably resisting bodily movement of the latter away from said valve seat.

4. In a fluid pressure system, a fluid flow control unit including a valve seat having a passage therethrough, a resilient valve element having a portion registering with and spaced from the region of said valve seat at which said passage is located, the latter portion of said valve element being deflectable into engagement with said valve seat by the application of fluid pressure on one of its sides for closing said passage, and a relief valve mounted in said valve seat adapted to open when the fluid pressure on said side of said valve seat exceeds a predetermined value.

5. In a fluid pressure system, a fluid flow control unit including a valve seat having a plurality of circumferentially spaced passages therethrough, a dish-shaped resilient valve element mounted on said valve seat having its central portions contacting with the latter and having curvilinear edge portions registering with said passages and normally spaced from said valve seat, said edge portions being deflectable into contacting relation with said valve seat under the influence of fluid pressure on one side thereof, and a resilient member yieldably urging the central portion of said valve element toward said valve seat.

6. In a fluid pressure system, a fluid flow control unit including a valve seat having a dished recess in one side and having a passage communicating with said recess, a resilient valve element adjacent the recessed side of said valve seat and registering with said passage, said valve element being adapted to deflect into said recess for closing said passage when fluid pressure is applied on one side thereof, and a relief valve in said valve seat adapted to open when the pressure on said side of said valve element exceeds a predetermined value.

7. In a fluid pressure system, a fluid flow control unit including a valve seat having a dished recess in one side and having a passage communicating with said recess, a resilient valve element adjacent the recessed side of said valve seat and registering with said passage, said valve element being adapted to deflect into said recess for closing said passage when fluid pressure is applied on one side thereof, and a resilient member yieldably holding said valve element against bodily movement relative to said valve seat.

8. In a fluid pressure system, a fluid flow control unit including a valve seat having a dished recess in one side and a plurality of circumferentially spaced passages communicating with said recess, a resilient valve element on said side of said valve seat and extending over said recess, said valve element being adapted to deflect into said recess and close said passages when fluid pressure is applied thereon, a stem on said valve seat, and a resilient element bearing between said stem and said valve element normally yieldably holding the edge portions of the latter in contact with said valve seat.

9. In a fluid pressure system, a fluid flow control unit including a valve seat having a dished recess in one side and a plurality of circumferentially spaced passages communicating with said recess, a resilient valve element on said side of said valve seat and extending over said recess, said valve element being adapted to deflect into said recess and close said passages when fluid pressure is applied thereon, a stem on said valve seat, a resilient element bearing between said stem and said valve element normally yieldably holding the edge portions of the latter in contact with said valve seat, and a relief valve mounted in said stem adapted to open when the pressure on said side of said valve exceeds a predetermined value.

10. In a fluid pressure system, a fluid flow control unit including a valve seat having a passage therein; a resilient valve element adjacent said valve seat, registering with said passage and adapted to be held in engagement with said valve seat by the application of fluid pressure on one side of the latter, said valve element when in a closed position being deflected from its normal relaxed contour by such fluid pressure and constructed and arranged in such a manner that successively adjacent portions thereof progressively become disengaged from said valve seat when the application of fluid pressure thereon is discontinued; and a relief valve adapted to open when the pressure on said side of said valve seat exceeds a predetermined value.

11. In a fluid pressure system, a fluid flow control unit including a valve seat having a passage therein; a resilient valve element adjacent said valve seat, registering with said passage and adapted to be held in engagement with said valve seat by the application of fluid pressure on one side of the latter, said valve element when in a closed position being deflected from its normal relaxed contour by such fluid pressure and constructed and arranged in such a manner that successively adjacent portions thereof progressively become disengaged from said valve seat when the application of fluid pressure thereon is discontinued; a resilient element normally yieldingly holding said valve element against movement away from said valve seat, and a relief valve adapted to open when the pressure on said side of said valve seat exceeds a predetermined value.

12. In a fluid pressure system a fluid flow control unit including a pair of relatively movable valve elements one having a passage therein and the other having a portion registering with said passage for closing the latter, one of said elements being resilient and adapted to be held in closed engagement with said valve seat by the application of fluid pressure thereon, said resilient valve element when in a closed position being deflected from its normal relaxed contour by such fluid pressure and constructed and arranged in such a manner that successively adjacent portions thereof progressively become disengaged from the other valve element when the application of fluid pressure thereon is discontinued, and means yieldably holding said valve elements against bodily movement away from each other.

13. In a fluid pressure system a fluid flow control unit including a pair of relatively movable valve elements one having a passage therein and the other having a portion registering with said passage for closing the latter, one of said elements being resilient and adapted to be held in closed engagement with said valve seat by the application of fluid pressure thereon, said resilient valve element when in a closed position being deflected from its normal relaxed contour by such fluid pressure and constructed and arranged in such a manner that successively adjacent portions thereof progressively become disengaged from the other valve element when the application of fluid pressure thereon is discontinued, and a relief valve on one of said valve elements adapted to open when the pressure on said unit exceeds a predetermined value.

VICTOR V. BECKEL.